United States Patent
Jung et al.

(10) Patent No.: US 10,581,072 B2
(45) Date of Patent: Mar. 3, 2020

(54) ANODE ACTIVE MATERIAL AND A LITHIUM SECONDARY BATTERY INCLUDING THE SAME

(71) Applicant: Samsung Electronics Co., Ltd., Suwon-si, Gyeonggi-do (KR)

(72) Inventors: Hee-chul Jung, Gunpo-si (KR); Jin-soo Mun, Seoul (KR); Jin-hwan Park, Seoul (KR); Gue-sung Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/880,735

(22) Filed: Jan. 26, 2018

(65) Prior Publication Data

US 2018/0151875 A1 May 31, 2018

Related U.S. Application Data

(62) Division of application No. 14/339,558, filed on Jul. 24, 2014, now Pat. No. 9,972,833.

(30) Foreign Application Priority Data

Nov. 27, 2013 (KR) .......................... 10-2013-0145452

(51) Int. Cl.
*H01M 4/36* (2006.01)
*H01M 10/052* (2010.01)
(Continued)

(52) U.S. Cl.
CPC .......... *H01M 4/366* (2013.01); *H01M 4/0402* (2013.01); *H01M 4/0471* (2013.01);
(Continued)

(58) Field of Classification Search
CPC ........ H01M 4/36; H01M 10/052; H01M 4/00; H01M 4/139; H01M 4/366; H01M 4/58;
(Continued)

(56) References Cited

U.S. PATENT DOCUMENTS

| | | | |
|---|---|---|---|
| 5,856,237 A | 1/1999 | Ku | ........................ C23C 16/42 |
| | | | 257/E21.165 |
| 5,915,181 A * | 6/1999 | Tseng | ................ H01L 21/28035 |
| | | | 257/E21.197 |

(Continued)

FOREIGN PATENT DOCUMENTS

| JP | H0555166 | 3/1993 |
|---|---|---|
| JP | 2000-067853 A | 3/2000 |

(Continued)

OTHER PUBLICATIONS

Malle et al. Applied Surface Science 260 (2012) 29-31 (Year: 2012).*

(Continued)

*Primary Examiner* — Alexander Usyatinsky
(74) *Attorney, Agent, or Firm* — Cantor Colburn LLP

(57) ABSTRACT

An anode active material for a lithium secondary battery, the anode active material including a metal silicide core, a silicon shell disposed on the core, and a metal nitride disposed on a surface of the silicon shell opposite the core.

22 Claims, 14 Drawing Sheets

(51) Int. Cl.
*H01M 4/58* (2010.01)
*H01M 4/04* (2006.01)
*H01M 4/1397* (2010.01)

(52) U.S. Cl.
CPC ........... H01M 4/1397 (2013.01); H01M 4/36 (2013.01); H01M 4/58 (2013.01); H01M 10/052 (2013.01); *Y02T 10/7011* (2013.01)

(58) Field of Classification Search
CPC ............. H01M 4/0402; H01M 4/1397; H01M 4/0471; Y02T 10/7011
See application file for complete search history.

(56) References Cited

U.S. PATENT DOCUMENTS

| | | | | |
|---|---|---|---|---|
| 2002/0142596 | A1* | 10/2002 | Wang | H01L 21/32137 438/689 |
| 2004/0258984 | A1 | 12/2004 | Ariel | H01M 4/0428 429/152 |
| 2009/0155527 | A1 | 6/2009 | Kawai | C04B 35/565 428/116 |
| 2011/0215280 | A1* | 9/2011 | Obrovac | H01M 4/38 252/516 |
| 2012/0080686 | A1 | 4/2012 | Mauder | H01L 21/0237 257/76 |

FOREIGN PATENT DOCUMENTS

| | | |
|---|---|---|
| JP | 2013-073818 A | 4/2013 |
| JP | 2013-084521 A | 5/2013 |
| KR | 10-1280914 B1 | 6/2013 |
| KR | 10-1375455 B1 | 3/2014 |

OTHER PUBLICATIONS

Satka et al."Microelectronics Journal 37 (2006) 1389-1395" (Year: 2006).*
JP2013_073818 MT.
KR101280914 MT. (original document provided by Applicant).
Satka et al.
JPH0555166 MT.
Kim et al., "Si/Ti Nanocomposites—Novel Anode Materials for Li-Ion Batteries", Electrochemical and Solid-State Letters, 3(11), 2000, pp. 493-496.
Maille et al.,"Study of the nitridation process of TiSi2 Powder", Applied Surface Science, 260, 2012, pp. 29-31.

* cited by examiner

ANODE ACTIVE MATERIAL AND A LITHIUM SECONDARY BATTERY INCLUDING THE SAME

RELATED APPLICATIONS

This application is a divisional application of application Ser. No. 14/339,558, filed Jul. 24, 2014, which claims priority to and the benefit of Korean Patent Application No. 10-2013-0145452, filed on Nov. 27, 2013, in the Korean Intellectual Property Office, and all the benefits accruing therefrom under 35 U.S.C. § 119, the content of which is incorporated herein in its entirety by reference.

BACKGROUND

1. Field

The present disclosure relates to an anode active material and a lithium secondary battery including the same. Specifically, provided are an anode active material that improves battery life cycle and storage properties, and a lithium secondary battery using the same.

2. Description of the Related Art

A lithium ion battery ("LIB") has a high energy density and is relatively easy to design. Therefore, the LIB has been a primary electric power source for mobile electronic devices in recent decades and the scope of LIB applications has extended to electric power storage apparatuses for electric vehicles and renewable energy devices. To meet market demand, an increasing number of studies are being conducted to provide improved LIB materials having a higher energy density and longer life cycle. In the case of an anode material, studies have been conducted on various materials such as carbon, silicon, tin, and germanium. Nonetheless, there remains a need for an improved anode material for lithium ion batteries.

SUMMARY

Provided are an anode active material for a lithium secondary battery, and a lithium secondary battery including the same having an excellent life cycle and rate capability.

An aspect provides an anode active material for a lithium secondary battery, the anode active material including:
 a metal silicide core;
 a silicon shell disposed on the core; and
 a metal nitride disposed on a surface of the silicon shell opposite the core.

Another aspect provides a method of preparing an anode active material for a lithium secondary battery including:
 milling a metal silicide; and
 heat-treating the milled metal silicide in nitrogen or ammonia at a temperature from about 800° C. to about 1200° C. for about one to about five hours to prepare the anode active material.

Another aspect provides a lithium secondary battery including the anode active material.

Another aspect provides a composite including:
 a porous metal silicide;
 a silicon phase including silicon and disposed on the porous metal silicide; and
 a metal nitride dispersed on an interface between the metal silicide and the silicon phase.

Another aspect provides a method of preparing the composite including:
 milling a mixture of silicon and a metal to form a precursor composite including silicon and the metal;
 heat-treating the precursor composite in nitrogen or ammonia to form a heat-treated precursor composite; and
 treating the heat-treated precursor composite with an etching agent to selectively etch the heat-treated precursor composite to prepare the composite.

Another aspect provides a lithium secondary battery including an anode active material including the composite.

BRIEF DESCRIPTION OF THE DRAWINGS

These and/or other aspects will become apparent and more readily appreciated from the following description of the embodiments, taken in conjunction with the accompanying drawings in which:

FIGS. 6A to 6D are images showing energy dispersive X-ray spectrometry ("EDX") mapping results of cross-sectional SEM images (FIG. 5) of the $TiSi_2$/Si/TiN anode active material prepared in Example 3, in which FIG. 6A is a nitrogen (N) map, FIG. 6B is a Ti map, FIG. 6C is a Si map, and FIG. 6D is a total map including N, Ti, and Si;

FIGS. 9A to 9G are images showing EDX mapping results of cross-sectional SEM images of the composite prepared in Example 4, in which FIG. 9A shows an image of a sample prepared by mixing Si and Ti powder and then milling the mixture for one hour, FIG. 9B shows an image of a sample prepared by additionally heat-treating (1100° C., 5 h, $NH_3$ atmosphere) after the milling, FIG. 9C shows an image of a sample prepared by additionally etching (in BOE solution for 10 minutes) after the heat-treating, and FIGS. 9D-9G show EDS mapping results of FIG. 9C, in which FIG. 9D is a nitrogen (N) map, FIG. 9E is a Ti map, FIG. 9F is a Si map, and FIG. 9G is a total map including N, Ti, and Si;

DETAILED DESCRIPTION

Figure 1:
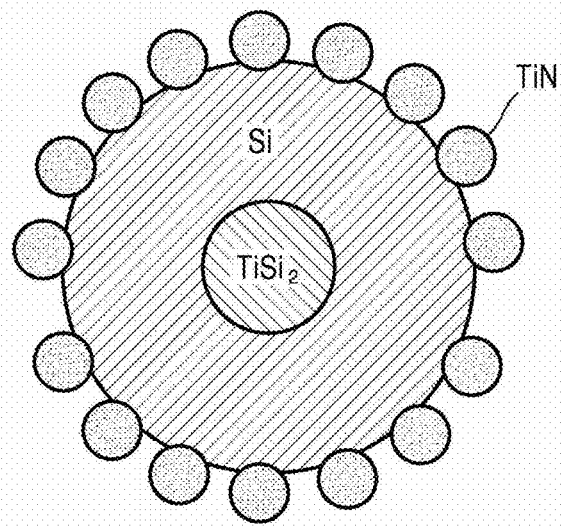
FIG. 1 is a schematic diagram showing a structure of an embodiment of an anode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list. It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Silicon-based materials are drawing much attention because silicon-based materials have an energy density per unit weight that is about ten times higher and an energy density per unit volume that is about two to three times higher than commercially available graphite materials at present. However, silicon-based anode materials have a drawback in that a side reaction between a silicon surface and an electrolyte forms an unstable solid electrolyte interface ("SEI") layer, which may decrease the electrochemical properties of the anode material or crush the anode material by internal stress caused by a drastic volume expansion taking place when the battery is charged and discharged.

To solve such a problem, various methods have been attempted including formation of a composite with an anode active material and various materials, synthesis of an anode active material within carbon tubes, preparation of an anode active material in the form of a wire or a nanoparticle, and counterbalancing of the stress caused by the volume expansion by surrounding an active material with an inert material. However, none of these methods are a satisfactory solution.

An anode active material according to an aspect includes a metal silicide core; a silicon shell disposed on the core; and a metal nitride dispersed on a surface of the silicon shell opposite the core.

FIG. 1 is a schematic diagram showing the structure of the anode active material. As shown in FIG. 1, a metal silicide, for example, titanium silicide ($TiSi_2$), is at a core surrounded by silicon (Si), e.g., silicon particles, and a metal nitride, for example, titanium nitride (TiN), is disposed on the surface of the silicon.

The terms "core" and "shell" of the anode active material refer to both a metal silicide core completely surrounded by a silicon shell and also to a metal silicide core partially surrounded by silicon.

An anode active material according to an embodiment includes a conductive metal nitride formed on the surface of a silicon surface, which is capable of improving a rate capability of an anode active material, and increasing a cycle life of a battery by preventing an electrolyte degradation reaction. While not wanting to be bound by theory, it is understood that the electrolyte degradation reaction occurs on a surface of the silicon particle and that repeated charging and discharging causes crushing of the anode active material caused by a volume change of a silicon particle.

When a lithium secondary battery including the anode active material is applied to an electric vehicle, an increased cycle life allows the electric vehicle to be used for a longer period of time and an improved rate capability results in improved acceleration performance of the electric vehicle. It is presumed that these results may be obtained because an electrolyte side reaction is inhibited by an improved surface layer on an anode surface and simultaneously the internal resistance of a battery is decreased as electron conductivity on the anode surface is improved.

While not wanting to be bound by theory, it is understood that a metal nitride formed on the surface inhibits formation of a solid electrolyte interface ("SEI") layer by preventing direct contact between silicon and an electrolyte and forms a conduction pathway on the silicon. As a result, the rate capability and cycle life of the battery may be improved.

In addition, the metal silicide of the core has a physical binding force with silicon particles constituting the shell and thus is capable of preventing crushing of silicon particles by internal stress.

The metal nitride may be dispersed on the silicon shell surface, and the dispersion of the metal nitride may include a uniform coating layer or an island of the metal nitride on the shell part surface, or also some of the metal nitride particles may be included in the silicon particles.

According to an embodiment, the metal silicide and the metal nitride may include the same metal, which may be, for example, at least one selected from Ti, V, Cu, and Zn.

A weight ratio of the metal nitride to silicon included in the silicon particle of the silicon shell part may be about 1.5 or less, for example, from about 0.5 to about 1.5.

In addition, a molar ratio of the metal silicide to silicon of the silicon shell part may be about 7.5 or less.

According to another embodiment, the metal silicide may be $TiSi_x$ ($0<x\leq2$).

A lithium battery according to another embodiment may employ the anode active material.

The anode active material may be prepared by using a method including milling a metal silicide and heat-treating the milled metal silicide in a nitrogen and/or ammonia atmosphere at a temperature from about 800° C. to about 1200° C., for example about 900° C. to about 1100° C., for about one to about five hours.

The heat treatment causes a phase separation of the metal silicide into silicon and a metal silicide to obtain an anode active material including a metal silicide core; a silicon shell; and a metal nitride dispersed on the silicon shell.

Figure 2:
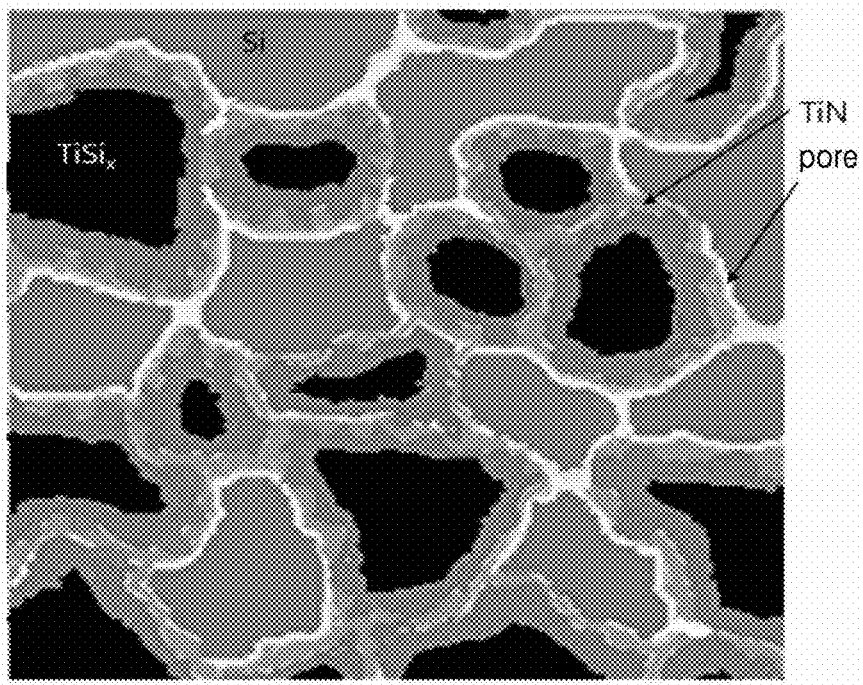
FIG. 2 is a schematic diagram showing a structure of an embodiment of a composite.

A composite according to another aspect includes a porous metal silicide phase, a silicon phase, and a metal nitride phase dispersed on an interface between the metal silicide phase and the silicon phase. FIG. 2 is a schematic diagram showing an exemplary structure of the composite. As shown in FIG. 2, a metal silicide, for example titanium silicide, may be present in the inside of the composite, silicon may be present around the metal silicide, and a metal nitride, which is titanium nitride, maybe present on the silicon surface or on the interface between the silicon and the metal silicide.

The porosity of the porous metal silicide may be from about 1% to about 10%, for example about 2% to about 8%.

The porous metal silicide and the metal nitride may include the same metal, which may be, for example, at least one selected from Ti, V, Cu, and Zn.

A weight ratio of the metal nitride to silicon included in the silicon particle may be from about 0.5 to about 1.5.

In addition, a molar ratio of the metal silicide to the silicon included in the silicon particle may be about 7.5 or less.

An anode active material according to another aspect may include the composite.

As the metal silicide of the anode active material is present in the center of the particle, it may be physically bound to the silicon particle and may act as a buffer relieving an internal stress caused by a volume expansion of the particle. Thus, it may prevent crushing among the silicon particles. In addition, the anode active material may provide pores in the metal silicide as a free space in which the particle volume may be expanded to relieve deterioration of an electrode caused by a change in volume.

Another aspect provides a method of preparing the composite including milling a mixture of silicon, e.g. silicon particles, and a metal, e.g. metal particles, to form a precursor composite of the silicon and the metal; heat-treating the precursor composite of the silicon and the metal in a nitrogen and/or ammonia atmosphere to form a heat-treated precursor composite; and treating the heat-treated precursor composite with a selective etching agent to selectively etch the heat-treated precursor composite to prepare a composite.

The milling may be performed for about 30 minutes to about 10 hours, for example about 1 hour to about 8 hours. In the milling, a composite of the silicon and the metal is formed. When heat-treating the composite in a nitrogen or ammonia atmosphere, the silicide included in the composite may react with nitrogen or ammonia and decomposed to form a metal nitride and silicon. The silicon is formed on the interface between the metal nitride and the metal silicide. In addition, when a resulting product of the heat-treating is treated with a selective etching agent, only the metal silicide is selectively etched to form pores.

The selective etching agent may be at least one selected from buffered oxide etchant ("BOE"), HF, HCl, and NaOH.

The treating with a selective etching agent may be performed until the metal silicide is completely etched.

The heat treatment may be performed at a temperature from about 800° C. to about 1200° C. for about one to about five hours.

Another aspect provides an anode active material including the composite. As the anode active material includes a porous metal silicide including pores, which may act as a buffer when the anode active material is expanded or shrinks while the battery is charged or discharged to prevent crushing of the anode active material. In addition, the silicon content in the anode active material may be relatively increased due to the pores so that the battery capacity may be increased.

Another aspect provides a lithium secondary battery including the anode active material including the composite. A method of preparing the lithium secondary battery is not particularly limited but the lithium secondary battery may be prepared by the exemplary method described below.

First, the anode is prepared.

Next, a cathode active material composition in which a cathode active material, a conductive material, a binder, and a solvent are mixed is prepared. The cathode active material composition is directly coated on a metal current collector and dried to prepare a cathode plate. Alternatively, the cathode active material composition may be casted on a separate support and then a film released from the support may be laminated on a metal current collector to prepare a cathode plate.

Any suitable material which allows for absorption/desorption of lithium and which may be used as a cathode active material in the art may be used as the cathode active material. For example, the cathode active material may be $LiCoO_2$, $LiMn_xO_{2x}$ (x=1 or 2), $LiNi_{1-x}Mn_xO_2(0<x<1)$, $LiNi_{1-x-y}Co_xMn_yO_2(0 \leq x \leq 0.5, 0 \leq y \leq 5)$, $LiFeO_2$, $V_2O_5$, TiS, or MoS, etc.

The conductive material may be carbon black or graphite microparticle but is not limited thereto. Any suitable material which may be used as a conductive material in the art may be used.

The binder may be copolymer of vinylidene fluoride and hexafluoropropylene, polyvinylidene fluoride (PVDF), polyacrylonitrile, polymethylmethacrylate, poly-tetra-fluoroethylene, or a mixture thereof, or a styrene butadiene rubber-based polymer, but is not limited thereto. Any suitable material which may be used as a binder in the art may be used.

The solvent may be N-methylpyrrolidone, acetone, or water, but is not limited thereto. Any suitable solvent which may be used in the art may be used.

The content of the cathode active material, conductive material, binder, and solvent can be determined by one of skill in the art of lithium batteries without undue experimentation, and thus such further details herein. Depending on the use and structure of a lithium battery, at least among the conductive material, the binder, and the solvent may be omitted.

Next, a separator which is interposed between the cathode and the anode is prepared. Any suitable material which is generally used as a separator in a lithium battery may be used. As the separator, a material having a low resistance to ion transfer in an electrolyte and a high electrolyte-containing capacity may be used. For example, a material selected from glass fiber, polyester, Teflon, polyethylene, polypropylene, polytetrafluoroethylene ("PTFE"), and a combination thereof may be used and may be in the form of a non-woven fabric or a woven fabric. For example, a windable separator such as polyethylene and polypropylene may be used for a lithium ion battery. For example, for a lithium ion polymer battery, a separator having an excellent impregnation capability with respect to an organic electrolyte solution may be used. A separator having an excellent impregnation capability with respect to an organic electrolyte solution may be prepared by the method described below.

A polymer resin, a filler, and a solvent are mixed to prepare a separator composition. The separator composition may be directly coated on top of an electrode and dried to form a separator. Alternatively, the separator composition may be cast on a support and dried, and then a separator film released from the support may be laminated on top of an electrode to form a separator.

The polymer resin used to prepare the separator is not particularly limited, and any material used in a binder of an electrode plate may be used. For example, copolymer of vinylidene fluoride and hexafluoropropylene), polyvinylidene fluoride, polyacrylonitrile, polymethyl methacrylate, or a mixture thereof may be used.

Next, an electrolyte is prepared.

The electrolyte may be a liquid or a gel. For example, the electrolyte may be an organic electrolyte solution. In addition, the electrolyte may be a solid. For example, the electrolyte may be boron oxide or lithium oxynitride but is not limited thereto. Any suitable material which may be used as a solid electrolyte in the art may be used. The solid electrolyte may be formed on the anode by a method such as sputtering.

For example, an organic electrolyte solution may be prepared. An organic electrolyte solution may be prepared by dissolving a lithium salt in an organic solvent.

Any organic solvent which may be used as an organic solvent in the art may be used. For example, the organic solvent is propylene carbonate, ethylene carbonate, fluoroethylene carbonate, diethyl carbonate, methyl ethyl carbonate, methyl propyl carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethyl acetamide, dimethyl sulfoxide, dioxane, 1,2-dimethoxyethane, sulfolane, dichloroethane, chlorobenzene, nitrobenzene, dimethyl carbonate, methyl isopropyl carbonate, ethyl propyl carbonate, dipropyl carbonate, dibutyl carbonate, diethylene glycol, dimethyl ether, or a mixture thereof.

Any suitable material which may be used as lithium salt in the art may be used as the lithium salt. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers.) LiCl, LiI, or a mixture thereof may be used.

Figure 3:
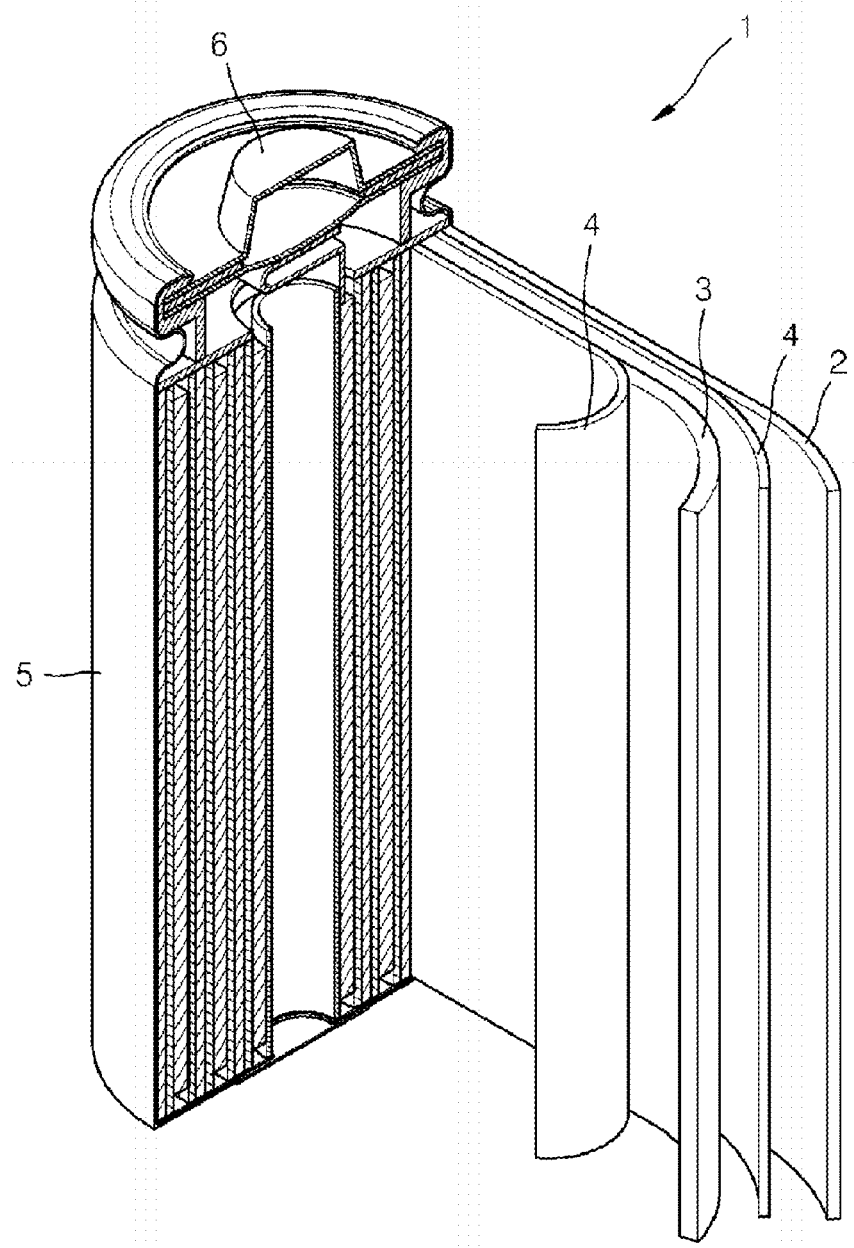
FIG. 3 is a diagram showing a structure of an embodiment of a lithium secondary battery.

As shown in FIG. 3, a lithium battery 1 includes a cathode 3, an anode 2, and a separator 4. The cathode 3, the anode 2, and the separator 4 are wound or bent to be included in a battery case 5. Then, an organic electrolyte solution is injected into the battery case 5 and the battery case 5 is sealed with a cap assembly 6 to complete the lithium battery 1. The battery case 5 may be a cylindrical shape, a square shape, or a thin-film shape. For example, the lithium battery 1 may be a thin-film battery. The lithium battery 1 may be a lithium ion battery.

A separator may be arranged between the cathode and the anode to form a battery structure. After the battery structure is laminated in a bi-cell structure, the battery structure is immersed in an organic electrolyte solution. The resulting product is included in a pouch and sealed to complete a lithium ion polymer battery.

In addition, a plurality of the battery structures may be laminated to form a battery pack, and the battery pack may be used in any devices requiring a high capacity and a high output. For example, the battery pack may be used in a laptop computer, a smartphone, an electric vehicle, and so on.

The mixed powder may be mixed with a conductive material, a binder, and a solvent to prepare a slurry and the slurry may be coated on a current collector and dried to prepare an anode.

Hereinafter, the present invention will be described in further detail with reference to examples. The examples are for illustrative purposes only and are not to be construed as limiting the scope of this disclosure.

EXAMPLES

Example 1

Preparation of Anode Active Material 3 g of titanium silicide powder (LTS Chemical Inc.) was milled using an SPEX mill to pulverize the powder (1-10 micrometers, μm). Then, the resulting product was heat-treated in nitrogen atmosphere ($N_2$) at 1100° C. for one hour to obtain a composite including titanium silicide, silicon, and silicon nitride.

Preparation of Anode and Lithium Secondary Battery

The composite prepared above as an anode active material, a conductive material (Ketchen black 300JD), and a binder (polyamide imide ("PAI")) N-methyl pyrrolidone ("NMP")) solution were mixed at a weight ratio of an anode active material:Ketchen black:PAI=8:1:1 in an agate mortar with pestles to prepare a slurry. The slurry was coated on a copper foil (15 μm thick) using a Doctor Blade by bar-coating. The resulting product was firstly dried at 80° C. and then rolled. Subsequently, the resulting product was secondly dried at a high temperature under reduced pressure (vacuum atmosphere, 200° C., for two hours) and then punched to prepare an electrode for a coin cell. The capacity of the electrode was about 2.1 to about 2.3 mAh/cm² and the thickness of the electrode excluding the foil was about 40 to about 50 um. 1.3M $LiPF_6$ EC/DEC/FEC (2/6/2) was used as an electrolyte solution. Lithium metal was used for a counter electrode and a reference electrode. A polypropylene separator (Cellgard® 3501) was used as a separator.

Example 2

An anode and a lithium battery were prepared in the same manner as in Example 1 except that the heat-treating time was changed to three hours in preparing an anode active material.

Example 3

An anode and a lithium battery were prepared in the same manner as in Example 1 except that the heat-treating time was changed to five hours in preparing an anode active material.

Figure 4:
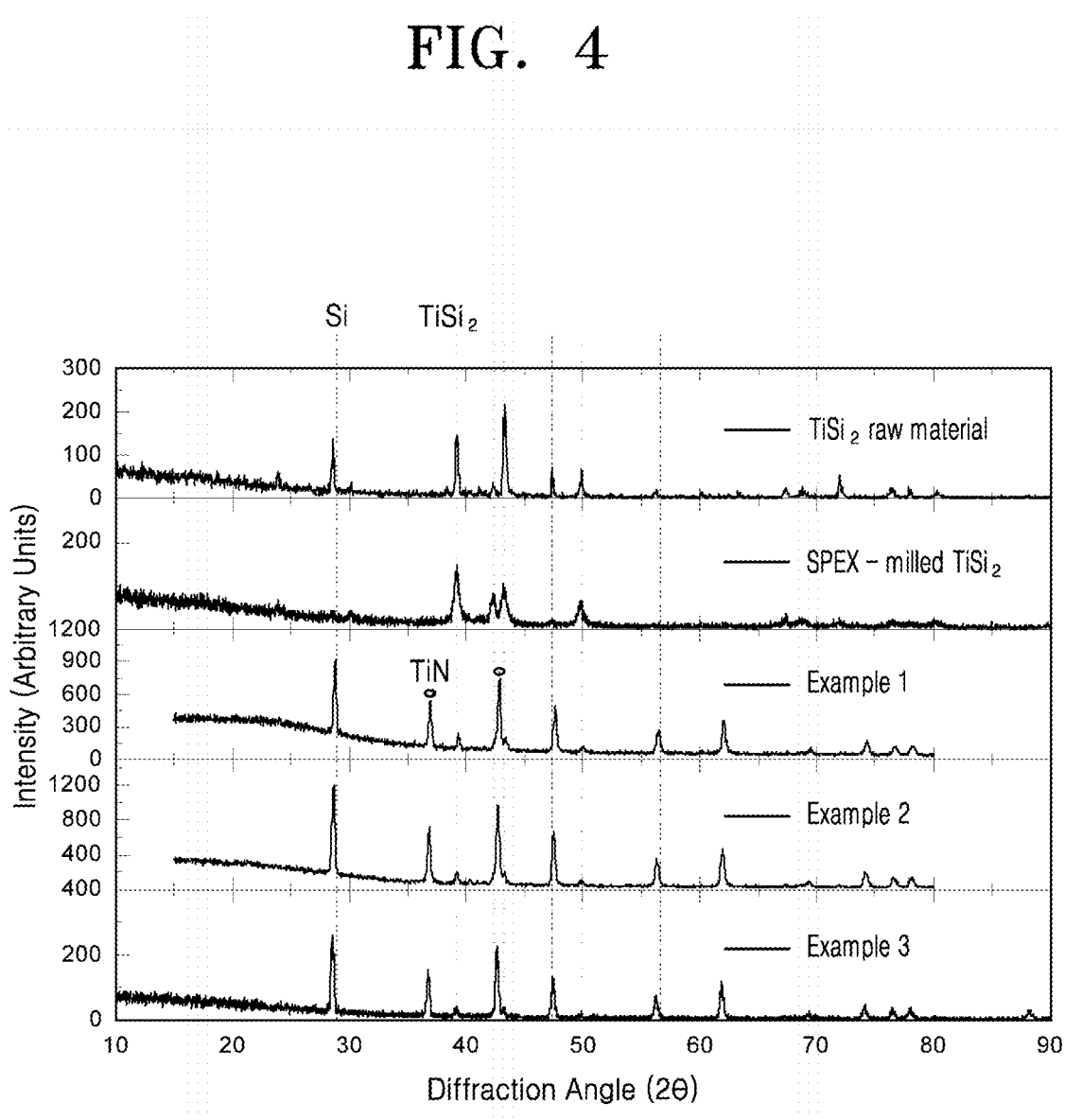
FIG. 4 is a graph of intensity (arbitrary units) versus diffraction angle (2 theta, 2θ) and shows an X-ray diffraction (XRD) patterns of anode active materials prepared in Examples 1 to 3.

FIG. 4 is an X-ray diffraction (XRD) graph of the anode active materials prepared in Examples 1 to 3. As shown in FIG. 4, a phase separation of $TiSi_2$ was caused by the heat-treating in the nitrogen atmosphere to form TiN. In addition, it is also noted that the height of the $TiSi_2$ phase peak was decreased as the time to perform the heat-treating was increased.

Figure 5:
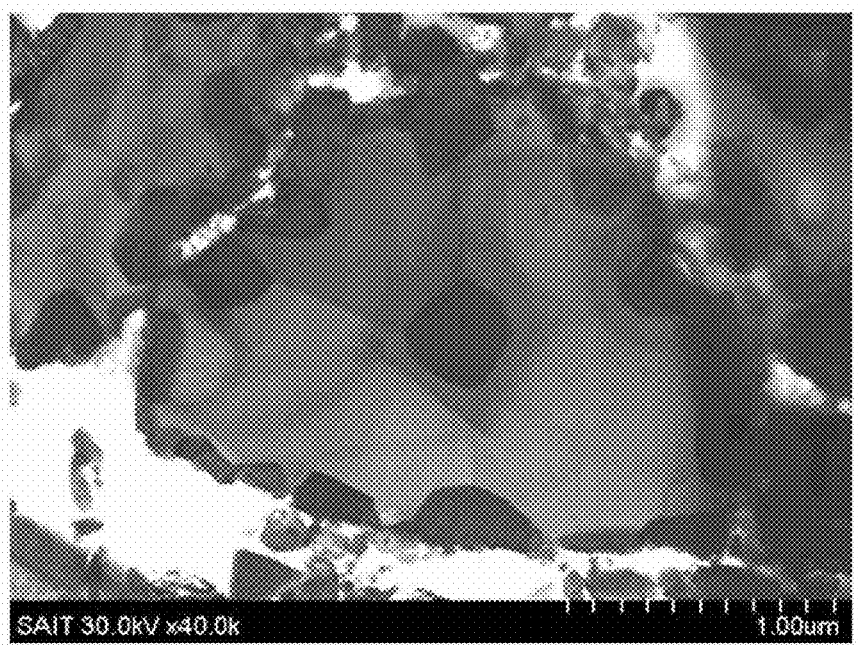
FIG. 5 is a cross-sectional scanning electron microscope ("SEM") image of an $TiSi_2$/Si/TiN anode active material prepared in Example 3.
Figure 6A:
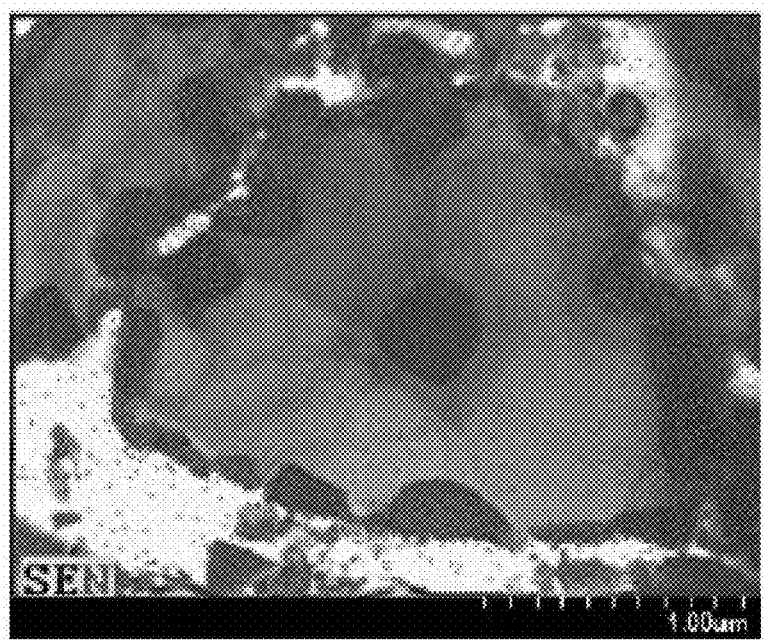
Figure 6B:
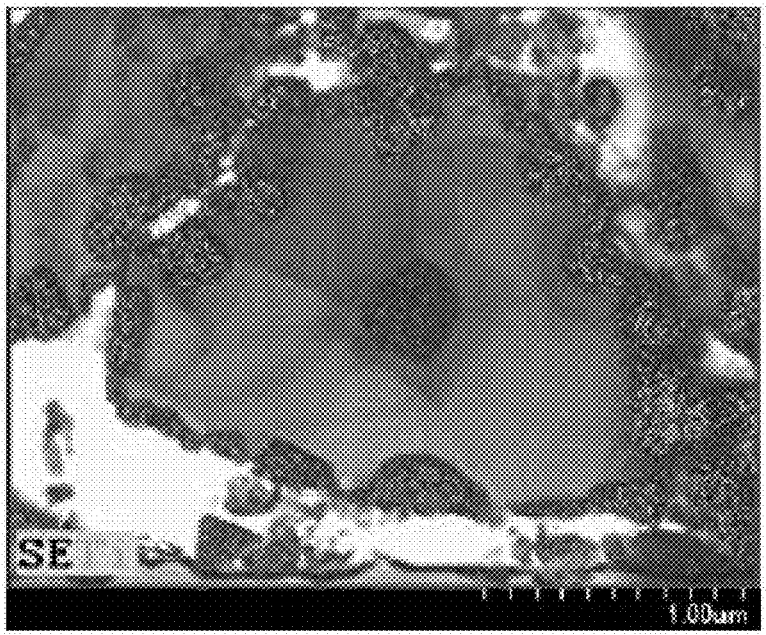
Figure 6C:
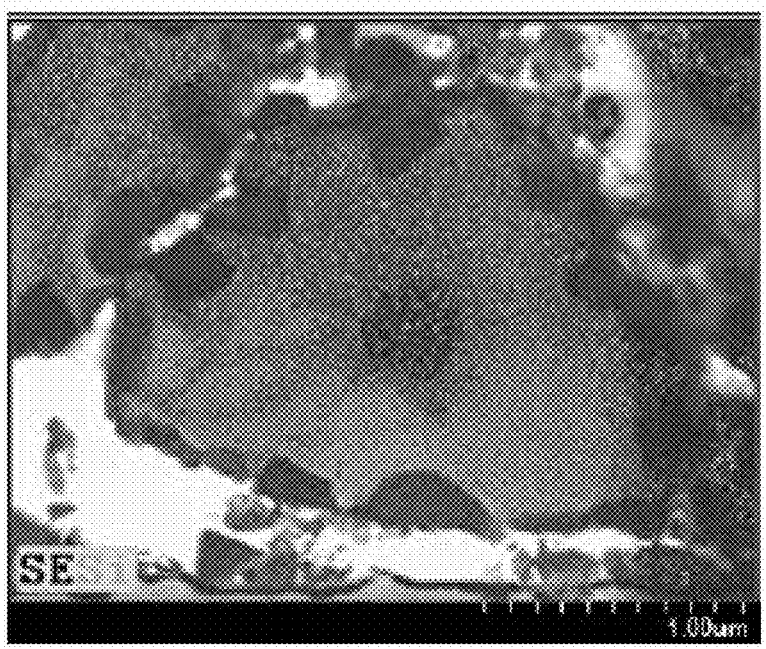
Figure 6D:
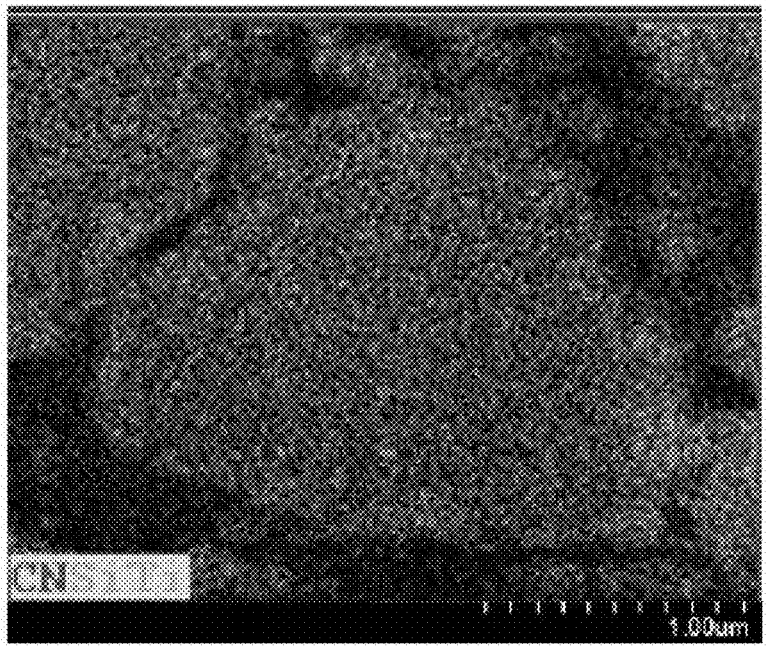

FIG. 5 is a cross-sectional scanning electron microscope ("SEM") image of the $TiSi_2$/Si/TiN anode active material prepared in Example 3. FIGS. 6A to 6D are images showing energy dispersive X-ray spectrometry ("EDX") mapping results thereof. FIG. 6A is a nitrogen (N) map, FIG. 6B is a Ti map, FIG. 6C is a Si map, and FIG. 6D is a total map including N, Ti, and Si. As shown in FIGS. 6A-6D, the $TiSi_2$ phase is in the middle of the particle, the Si phase is around the $TiSi_2$ phase, and the TiN phase is dispersed in an outermost region of the particle.

Example 4

A silicon particle and a titanium particle were mixed at a molar ratio of 1:1 (silicon:1.109 g, titanium:1.891 g) in an agate mortar with pestles. The resulting mixture was milled by using an SPEX mill for one hour and then heat-treated in an $NH_3$ atmosphere at 1100° C. for five hours. The resulting product was immersed in a BOE solution ($NH_4F$ (40 vol. % in $H_2O$)/HF (49 vol. % in $H_2O$)=6/1) for ten minutes to perform etching. As a result, a composite was obtained.

A lithium secondary battery was prepared in the same manner as in Example 1 except that the composite was used as an anode active material.

Figure 7:
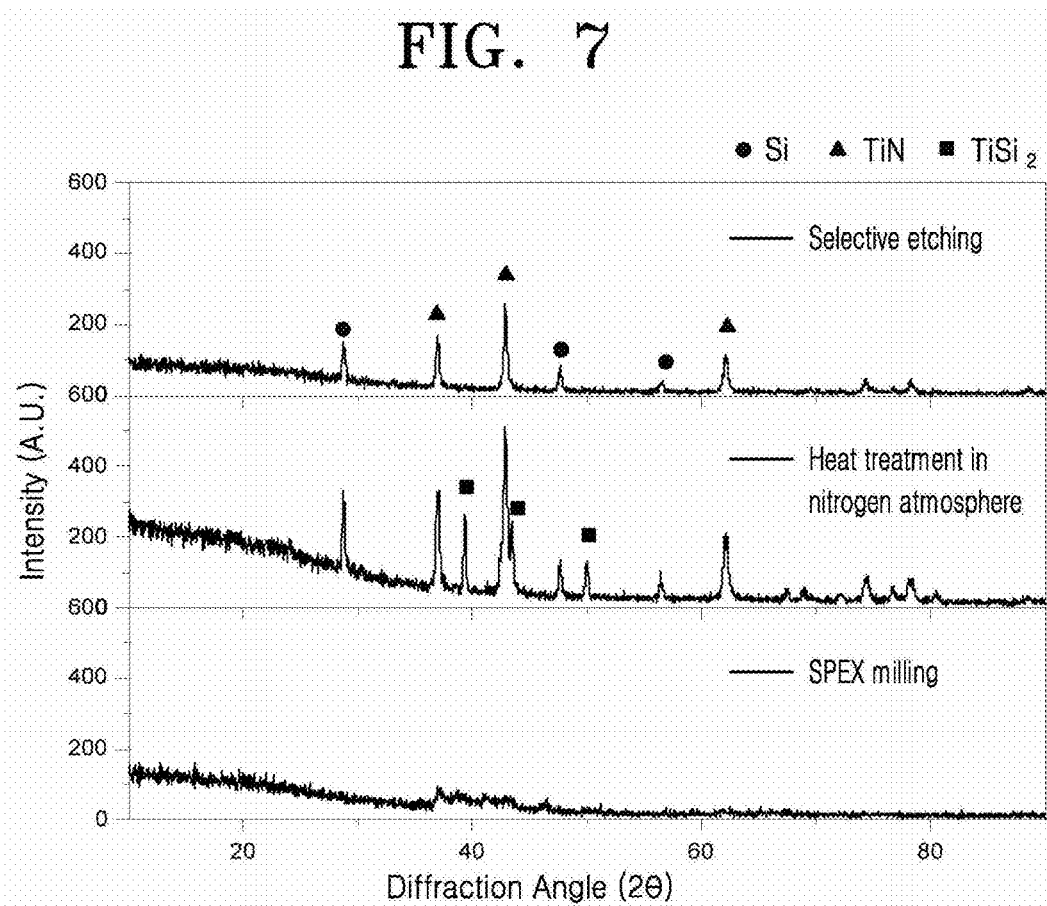
FIG. 7 a graph of intensity (arbitrary units) versus diffraction angle (2 theta, 2θ) and is an XRD pattern of the composite prepared in Example 4.

FIG. 7 is an XRD graph of the composite prepared in Example 4. As shown in FIG. 7, as a result of milling the mixture powder of Ti powder and Si powder, an amorphous TiSi alloy was produced. As a result of heat-treating the amorphous TiSi alloy, Si and TiN were produced and the size of the $TiSi_2$ microparticle was increased. In addition, as a result of selective etching, pores were formed in the $TiSi_2$ phase.

Figure 8:
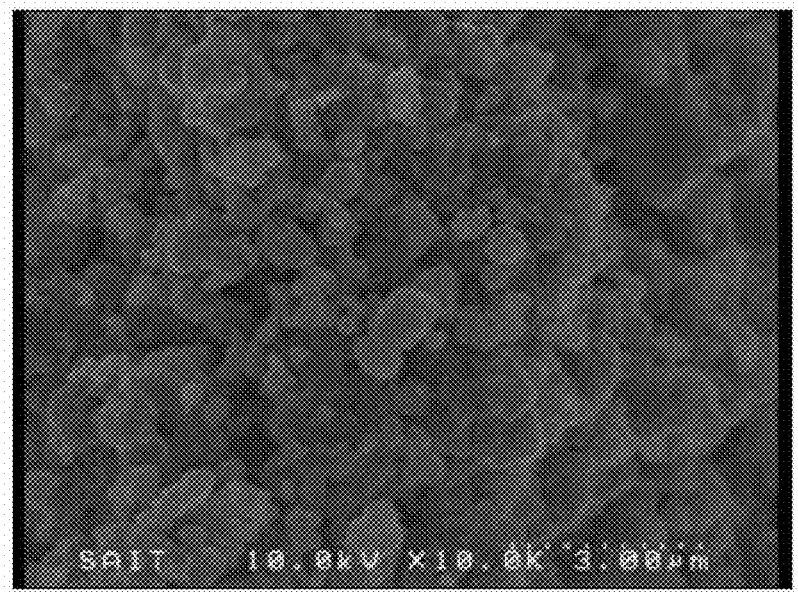
FIG. 8 is a cross-sectional SEM image of the composite prepared in Example 4.

FIG. 8 is a cross-sectional SEM image of the composite prepared in Example 4.

Figure 9A:
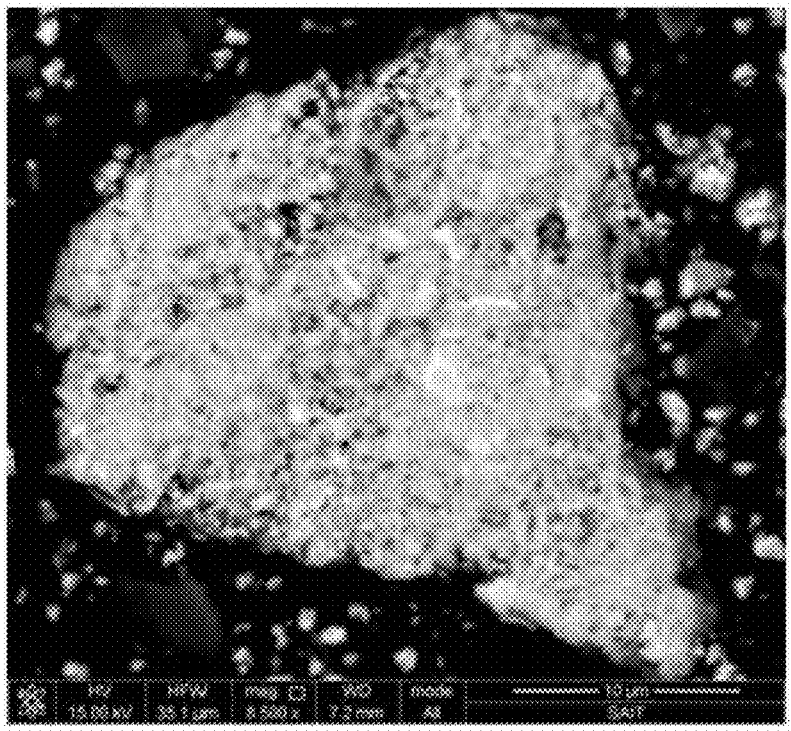
Figure 9B:
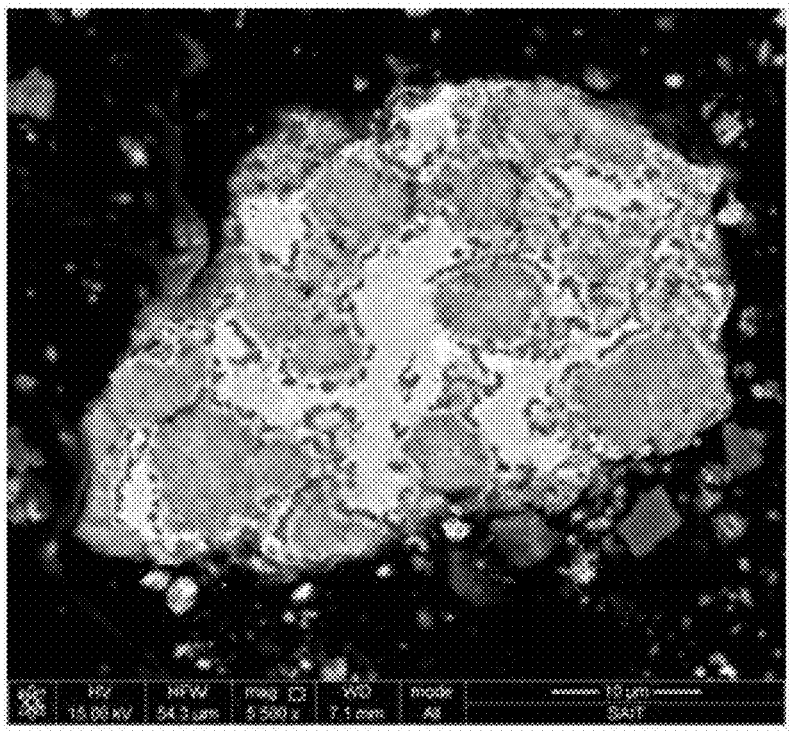
Figure 9C:
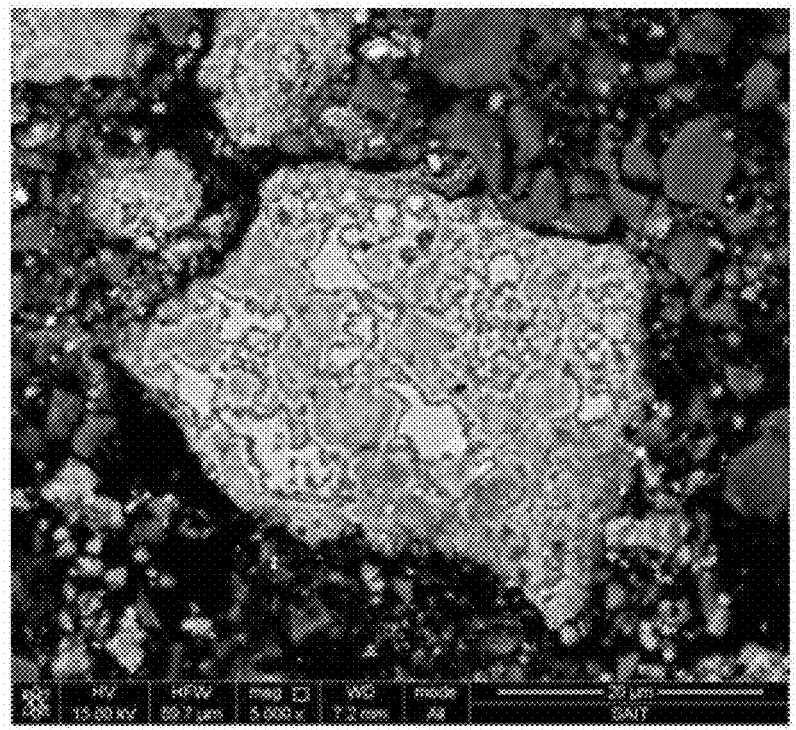
Figure 9D:
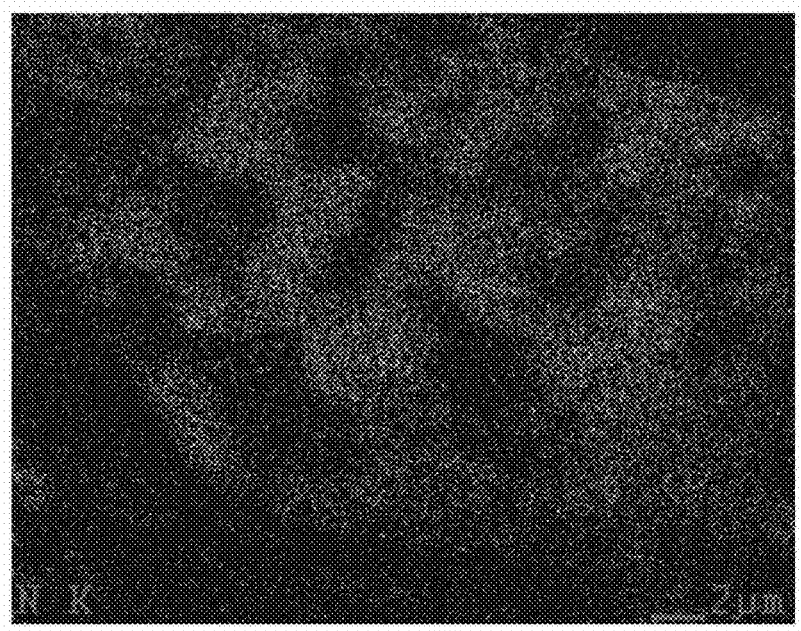
Figure 9E:
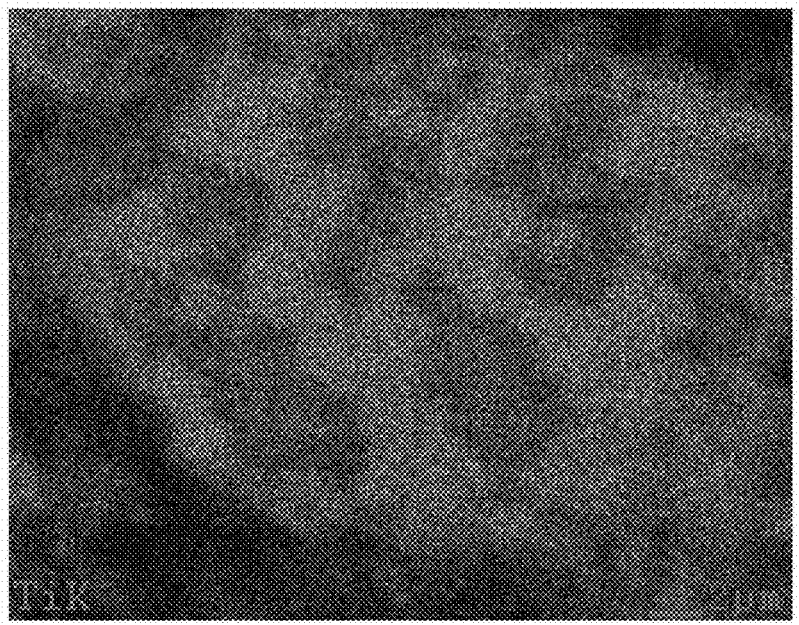
Figure 9F:
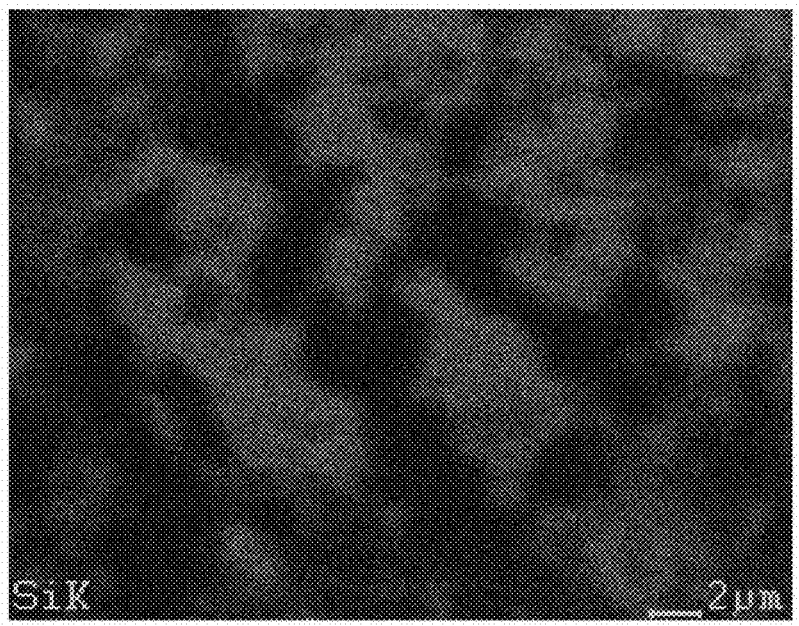
Figure 9G:
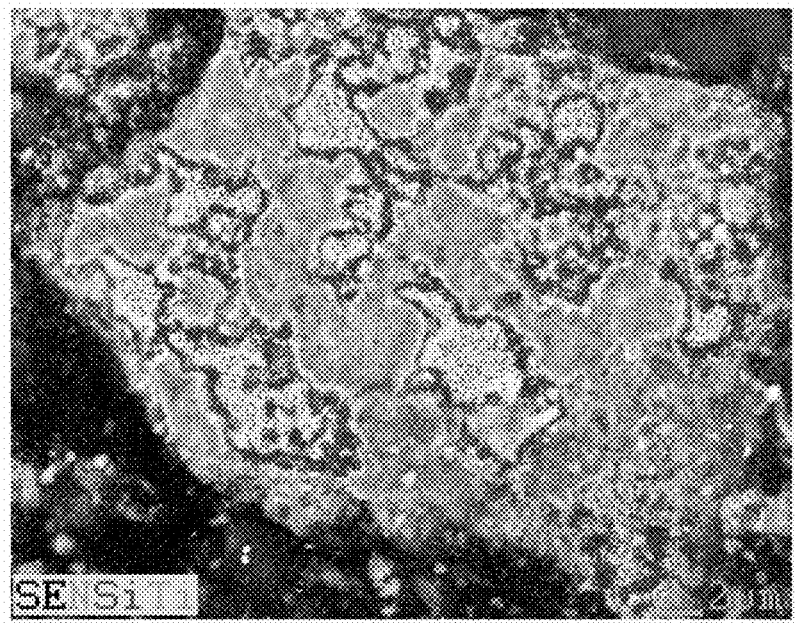

FIGS. 9A to 9G are images showing EDX mapping results of the cross-sectional SEM images of the composite prepared in Example 4. FIG. 9A shows an image of a sample prepared by mixing Si and Ti powder and then milling the mixture for one hour. FIG. 9B shows an image of a sample prepared by additionally heat-treating (1100° C., 5 h, $NH_3$ atmosphere) after the milling. FIG. 9C shows an image of a sample prepared by additionally etching (in BOE solution for 10 minutes) after the heat-treating. FIGS. 9D-9G show EDS mapping results of FIG. 9C, in which FIG. 9D is a nitrogen (N) map, FIG. 9E is a Ti map, FIG. 9F is a Si map, and FIG. 9G is a total map including N, Ti, and Si. As shown in FIGS. 9A-9G, as a result of the milling of the Ti and Si mixture powder and the heat-treating of the milled product in nitrogen atmosphere, TiN was formed and Si existed on the interface between $TiSi_2$ and TiN. In addition, it is also shown that, as a result of selective etching, pores were formed in the $TiSi_2$.

Comparative Example 1

An anode and a lithium secondary battery were prepared in the same manner as in Example 1 except that only silicon powder was used as an anode active material.

Comparative Example 2

An anode and a lithium secondary battery were prepared in the same manner as in Example 1 except that a Si/TiN composite prepared by mixing silicon powder and titanium nitride powder and milling the mixture powder was used as an anode active material.

Comparative Example 3

An anode and a lithium secondary battery were prepared in the same manner as in Example 1 except that titanium silicide powder was used as an anode active material.

Comparative Example 4

An anode and a lithium secondary battery were prepared in the same manner as in Example 1 except that milled titanium silicide powder (milled $TiSi_2$) was used as an anode active material.

Evaluation Example 1

Battery Capacity and Rate Capability

To investigate the capacity of the batteries prepared in the above Examples and Comparative Examples, charging/discharging was performed at a low rate (0.2 C/0.2 C, wherein a C rate is a current which will discharge a battery in one hour). To investigate the rate capability of the batteries, charging/discharging was performed at a rate of 0.2 C/2 C.

The initial efficiency is calculated as follows:

Initial efficiency (%)=(the first discharge capacity/the first charge capacity)×100%

The calculation results are shown in Table 1 below.

TABLE 1

| | Initial Efficiency [%] | The first Charge/ Discharge Capacity (0.1 C) [mAh/g] | The second Charge/ Discharge Capacity (0.2 C) [mAh/g] | Rate Capability (2 C/0.2 C) [%] |
|---|---|---|---|---|
| Example 1 | 81.4 | 1708/1390 | 1398/1352 | 91 |
| Example 2 | 81.4 | 1754/1427 | 1441/1393 | 96 |
| Example 3 | 81.3 | 1817/1477 | 1494/1445 | 94 |
| Example 4 | 71.6 | 1194/855 | 869/830 | 97 |
| Comparative Example 1 | 72.3 | 4017/2902 | 2931/2250 | 3 |
| Comparative Example 2 | 81.5 | 1975/1609 | 1637/1571 | 82.11 |
| Comparative Example 3 | 46.7 | 446/208 | 218/192 | 114 |
| Comparative Example 4 | 41.4 | 419/173 | 189/161 | 58 |

As shown in Table 1, the rate capability of the lithium secondary battery including the anode active material according to the Examples was much higher than that of the Comparative Examples. The capacity of the lithium secondary battery including the anode active material according to the Examples was also better than that of the batteries including $TiSi_2$.

Life Cycle

The lithium secondary batteries prepared in the Examples and Comparative Examples were charged with 50 mA of current per 1 g of anode active material until the voltage reached 0.01 V (vs. Li) and were then discharged with the same current until the voltage reached 1.5V (vs. Li). Afterwards, charging and discharging were repeated with the same current in the same voltage range a hundred times.

Figure 10A:
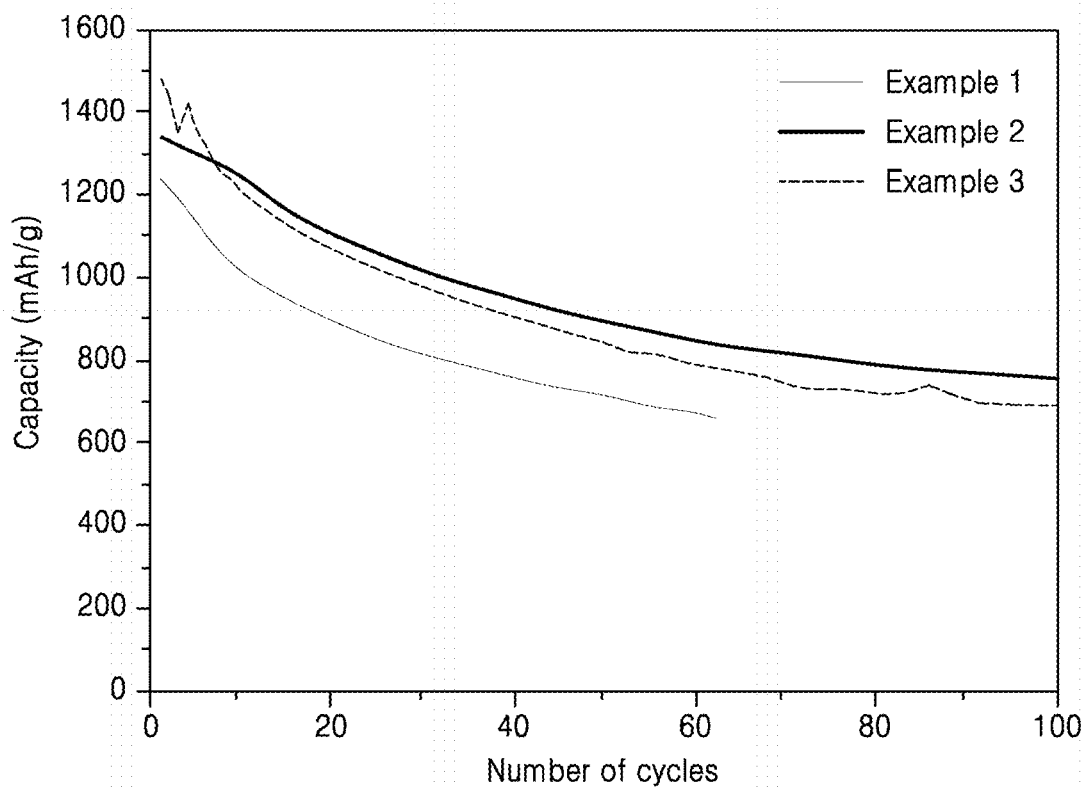
FIG. 10A is a graph of capacity (milliamp hours per gram, mAh/g) versus number of cycles showing the cycle life of batteries obtained in Examples 1 to 3.
Figure 10B:
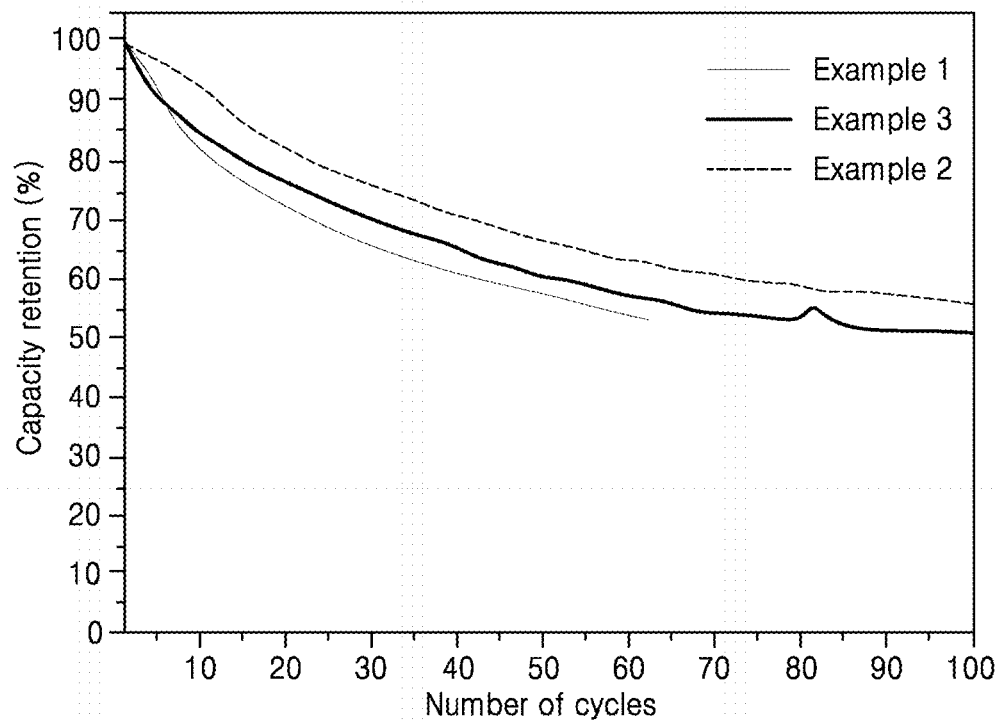
FIG. 10B is a graph of capacity retention (percent, %) versus number of cycles of batteries obtained in Examples 1 to 3.

FIGS. 10A and 10B are graphs showing the life cycle of the batteries obtained in Examples 1 to 3.

Figure 11A:
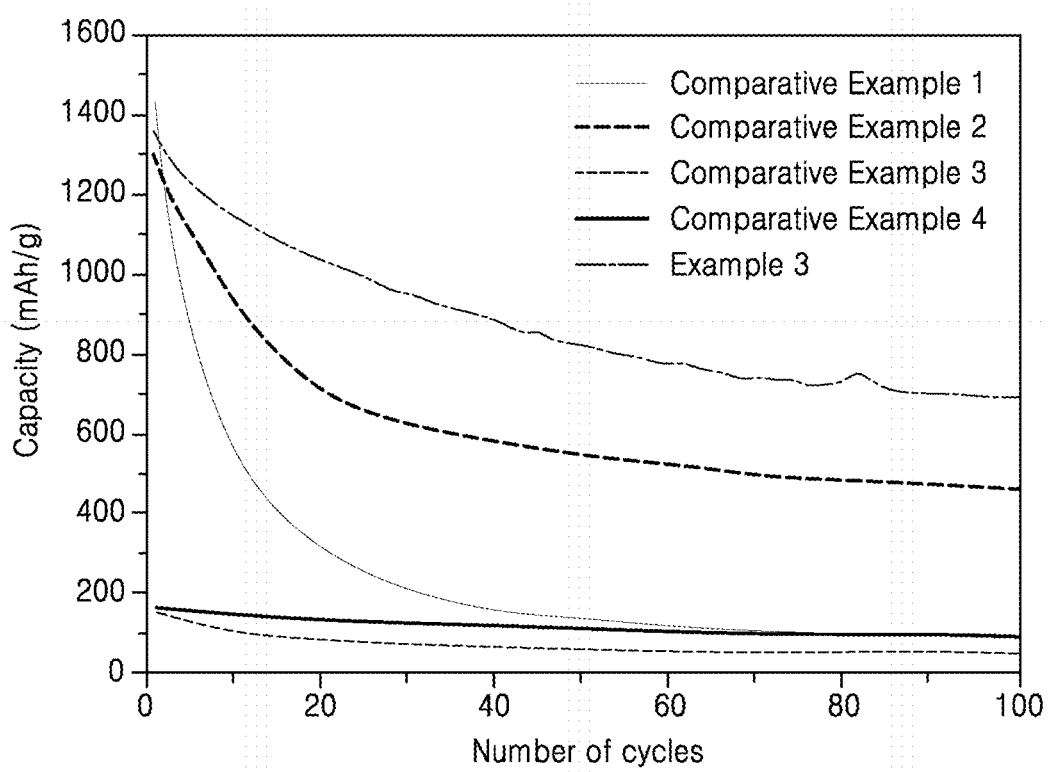
FIG. 11A is a graph of capacity (milliamp hours per gram, mAh/g) versus number of cycles showing cycle life of batteries obtained in Example 3 and Comparative Examples 1 to 4.
Figure 11B:
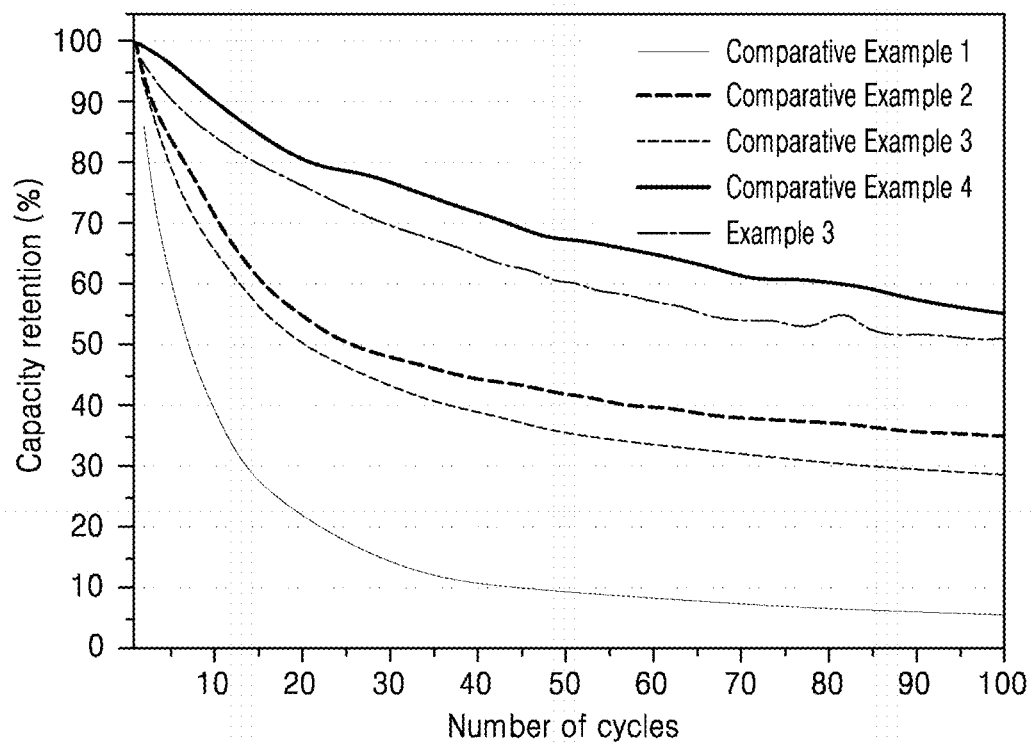
FIG. 11B is a graph of capacity retention (percent, %) versus number of cycles of batteries obtained in Example 3 and Comparative Examples 1 to 4.

FIGS. 11A and 11B are graphs showing the life cycle of the batteries obtained in Examples 3 and Comparative Examples 1 to 4.

As shown in FIGS. 10A-10B and FIGS. 11A-11B, the batteries according to the Examples showed a longer life cycle than that of the batteries according to the Comparative Examples. Because of the structural advantages, the life cycle of the batteries according to the Examples was longer than that of the batteries including a Si/TiN composite and having a similar composition.

Figure 12:
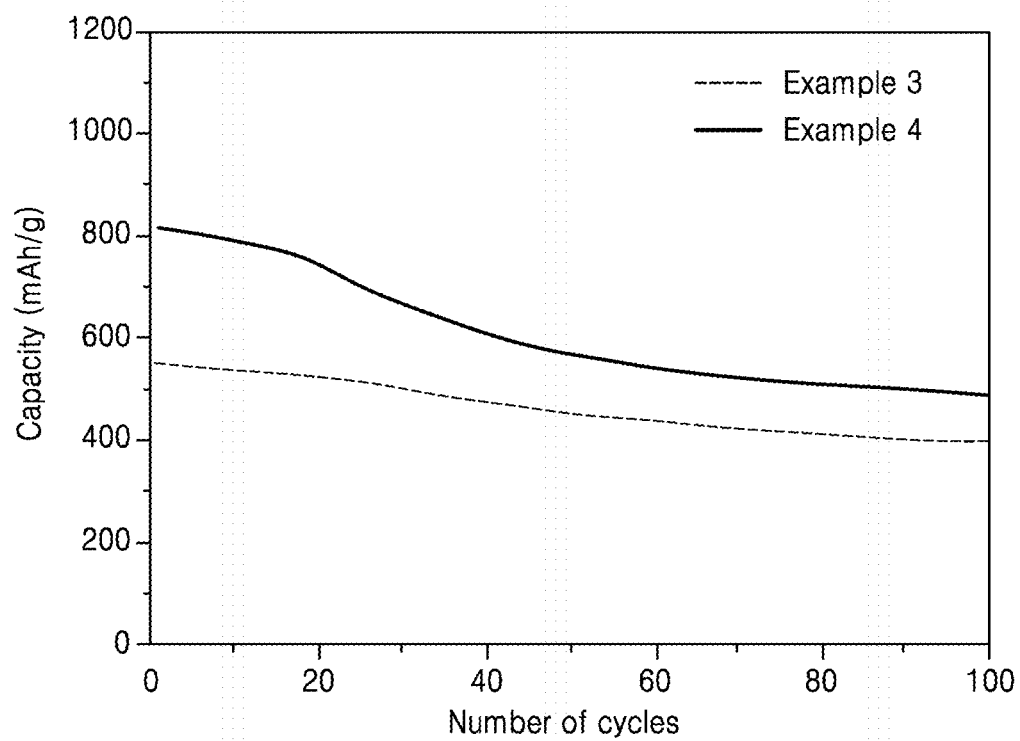
FIG. 12 is a graph of capacity (milliamp hours per gram, mAh/g) versus number of cycles showing a capacity depending on the number of charge/discharge cycles of the lithium battery prepared in Example 4.

FIG. 12 is a graph showing the capacity depending on the number of charge/discharge cycles of the lithium battery prepared in Example 4. As shown in FIG. 12, the life cycle of the lithium battery prepared in Example 4 is improved.

As described above, according to the one or more of the above embodiments, the anode active material according to an embodiment may provide a lithium secondary battery having an excellent life cycle and rate capability.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An anode active material for a lithium secondary battery, the anode active material comprising:
    a porous metal silicide core;
    a silicon shell disposed on the core; and
    a metal nitride disposed on a surface of the silicon shell opposite the core, and
    wherein a molar ratio of the metal silicide to the silicon included in the silicon shell is about 7.5 or less.

2. The anode active material for the lithium secondary battery of claim 1, wherein a metal of the metal silicide and a metal of the metal nitride comprise a same metal.

3. The anode active material for the lithium secondary battery of claim 2, wherein the metal silicide and the metal nitride comprise at least one metal selected from Ti, V, Cu, and Zn.

4. The anode active material for the lithium secondary battery of claim 1, wherein a weight ratio of the metal nitride to silicon included in the silicon shell is from about 0.5 to about 1.5.

5. The anode active material for the lithium secondary battery of claim 1, wherein the metal silicide is of the formula $TiSi_x$, wherein $0<x\le2$.

6. An anode for a lithium secondary battery comprising the anode active material of claim 1.

7. A method of preparing the anode active material for a lithium secondary battery of claim 1, the method comprising:
    milling a metal silicide; and
    heat-treating the milled metal silicide in nitrogen or ammonia at a temperature from about 800° C. to 1200° C. for about one to about five hours to prepare the anode active material.

8. A method of preparing an anode active material for a lithium secondary battery, the method comprising:
    milling a mixture of silicon and a metal to form a precursor composite comprising the silicon and the metal;
    heat-treating the precursor composite in nitrogen or ammonia to form a heat-treated precursor composite, wherein the heat-treated precursor composite includes a metal silicide, a metal nitride, and the silicon formed on the interface between the metal nitride and the metal silicide; and
    treating the heat-treated precursor composite with an etching agent to selectively etch the metal silicide of the heat-treated precursor composite and form pores in the metal silicide to prepare the anode active material,
    wherein the anode active material comprises
        a porous metal silicide core;
        a silicon shell disposed on the core; and
        a metal nitride dispersed on a surface of the silicon shell opposite the core, and
        wherein a molar ratio of the metal silicide to the silicon included in the silicon shell is about 7.5 or less.

9. The method of claim 8, wherein the etching agent is at least one selected from a buffered oxide etchant, HF, HCl, and NaOH.

10. The method of claim 8, wherein the heat-treating is performed at a temperature from about 800° C. to about 1200° C. for about one to about five hours.

11. The method of claim 8, wherein the treating with the etching agent is performed until an entirety of the metal silicide is etched to form the pores in the entirety of the metal silicide.

12. An anode active material for a lithium secondary battery, the anode active material comprising:
a porous metal silicide core;
a silicon shell disposed on the core; and
a metal nitride disposed on a surface of the silicon shell opposite the core, and
wherein a weight ratio of the metal nitride to silicon included in the silicon shell is from about 0.5 to about 1.5.

13. The anode active material for the lithium secondary battery of claim 1, wherein a metal of the metal silicide and a metal of the metal nitride comprise a same metal.

14. The anode active material for the lithium secondary battery of claim 2, wherein the metal silicide and the metal nitride comprise at least one metal selected from Ti, V, Cu, and Zn.

15. The anode active material for the lithium secondary battery of claim 1, wherein a molar ratio of the metal silicide to the silicon included in the silicon shell is about 7.5 or less.

16. The anode active material for the lithium secondary battery of claim 1, wherein the metal silicide is of the formula $TiSi_x$, wherein $0<x\leq2$.

17. An anode for a lithium secondary battery comprising the anode active material of claim 1.

18. A method of preparing the anode active material for a lithium secondary battery of claim 1, the method comprising
milling a metal silicide; and
heat-treating the milled metal silicide in nitrogen or ammonia at a temperature from about 800° C. to 1200° C. for about one to about five hours to prepare the anode active material.

19. A method of preparing an anode active material for a lithium secondary battery, the method comprising:
milling a mixture of silicon and a metal to form a precursor composite comprising the silicon and the metal;
heat-treating the precursor composite in nitrogen or ammonia to form a heat-treated precursor composite, wherein the heat-treated precursor composite includes a metal silicide, a metal nitride, and the silicon formed on the interface between the metal nitride and the metal silicide; and
treating the heat-treated precursor composite with an etching agent to selectively etch the metal silicide of the heat-treated precursor composite and form pores in the metal silicide to prepare the anode active material,
wherein the anode active material comprises
a porous metal silicide;
a silicon shell disposed on the core; and
a metal nitride dispersed on a surface of the silicon shell opposite the core, and
wherein a weight ratio of the metal nitride to silicon included in the silicon shell is from about 0.5 to about 1.5.

20. The method of claim 19, wherein the etching agent is at least one selected from a buffered oxide etchant, HF, HCl, and NaOH.

21. The method of claim 19, wherein the heat-treating is performed at a temperature from about 8000 C to about 12000 C for about one to about five hours.

22. The method of claim 19, wherein the treating with the etching agent is performed until an entirety of the metal silicide is completely etched.

* * * * *